United States Patent
Gao et al.

(10) Patent No.: US 10,659,268 B2
(45) Date of Patent: *May 19, 2020

(54) WIRELESS COMMUNICATION METHOD AND DEVICE

(71) Applicant: Panasonic Intellectual Property Corporation of America, Torrance, CA (US)

(72) Inventors: Chi Gao, Beijing (CN); Li Wang, Beijing (CN); Lilei Wang, Beijing (CN); Hidetoshi Suzuki, Kanagawa (JP); Masayuki Hoshino, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/395,889

(22) Filed: Apr. 26, 2019

(65) Prior Publication Data

US 2019/0253295 A1 Aug. 15, 2019

Related U.S. Application Data

(63) Continuation of application No. 15/601,600, filed on May 22, 2017, now Pat. No. 10,397,036, which is a
(Continued)

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

| 8,638,880 B2 * | 1/2014 | Baldemair ........... H04J 11/0033 375/308 |
| 8,730,850 B2 * | 5/2014 | Noh ..................... H04L 5/0023 370/280 |

(Continued)

FOREIGN PATENT DOCUMENTS

| WO | 2011/003180 A1 | 1/2011 |
| WO | 2014/069958 A1 | 5/2014 |

(Continued)

OTHER PUBLICATIONS

Colombian Examiner's Opinion dated Apr. 24, 2018 for the related Colombian Patent Application No. NC2017/0005562.
(Continued)

*Primary Examiner* — Bunjob Jaroenchonwanit
(74) *Attorney, Agent, or Firm* — Seed IP Law Group LLP

(57) ABSTRACT

Provided are wireless communication methods and devices. In one embodiment, a wireless communication method performed by a wireless communication device comprises: transmitting a data packet repeatedly in multiple subframes including at least one normal subframe and at least one special subframe to another wireless communication device, wherein the available resources in the special subframe are different from that in the normal subframe, the data packet includes multiple modulated symbols which are divided into multiple modulated-symbol sets, in each subframe, each OFDM symbol is mapped by one of the modulated-symbol sets, and in every subframe, the modulated symbols in the same modulated-symbol set are mapped onto REs in one OFDM symbol in a fixed order. In another embodiment, multiple repetitions of the data packet are transmitted in
(Continued)

each subframe, and in each special subframe, different repetitions are mapped onto REs with cyclic shift.

12 Claims, 10 Drawing Sheets

Related U.S. Application Data continuation of application No. PCT/CN2015/071807, filed on Jan. 29, 2015.

(51) Int. Cl.
*H04W 72/04* (2009.01)
*H04L 5/14* (2006.01)

(52) U.S. Cl.
CPC ....... *H04L 27/2607* (2013.01); *H04W 72/042* (2013.01); *H04W 72/0413* (2013.01); *H04L 5/0048* (2013.01); *H04L 5/1469* (2013.01)

(56) References Cited

U.S. PATENT DOCUMENTS

| | | | |
|---|---|---|---|
| 10,397,036 B2* | 8/2019 | Gao | H04L 5/0044 |
| 2007/0258358 A1* | 11/2007 | Cho | H04L 27/2607 |
| | | | 370/208 |
| 2009/0016265 A1* | 1/2009 | Katayama | H04L 1/1819 |
| | | | 370/328 |
| 2010/0279707 A1* | 11/2010 | Fischer | G01S 5/021 |
| | | | 455/456.1 |
| 2011/0122837 A1* | 5/2011 | Lin | H04B 7/0617 |
| | | | 370/329 |
| 2012/0163335 A1* | 6/2012 | Chung | H04L 5/0023 |
| | | | 370/330 |
| 2012/0201220 A1* | 8/2012 | Kim | H04J 13/0062 |
| | | | 370/329 |
| 2012/0257553 A1 | 10/2012 | Noh et al. | |
| 2013/0064216 A1* | 3/2013 | Gao | H04L 5/0016 |
| | | | 370/330 |
| 2013/0201926 A1* | 8/2013 | Nam | H04L 1/1685 |
| | | | 370/329 |
| 2013/0308563 A1* | 11/2013 | Xiao | H04L 1/0007 |
| | | | 370/329 |
| 2014/0023002 A1* | 1/2014 | Wilson | H04W 72/0406 |
| | | | 370/329 |
| 2014/0126517 A1* | 5/2014 | Choi | H04L 5/001 |
| | | | 370/329 |
| 2014/0153427 A1* | 6/2014 | Seo | H04L 1/20 |
| | | | 370/252 |
| 2014/0198675 A1* | 7/2014 | He | H04L 5/0048 |
| | | | 370/252 |
| 2015/0036616 A1* | 2/2015 | Lee | H04L 5/0023 |
| | | | 370/329 |
| 2015/0085795 A1* | 3/2015 | Papasakellariou | H04L 5/006 |
| | | | 370/329 |
| 2015/0163783 A1* | 6/2015 | Kim | H04W 72/0406 |
| | | | 370/329 |
| 2015/0181533 A1* | 6/2015 | Chen | H04W 52/146 |
| | | | 455/522 |
| 2015/0230211 A1* | 8/2015 | You | H04L 5/0051 |
| | | | 370/330 |
| 2015/0237523 A1* | 8/2015 | Chun | H04W 24/10 |
| | | | 370/252 |
| 2015/0245323 A1 | 8/2015 | You et al. | |
| 2015/0257132 A1* | 9/2015 | Park | H04B 7/068 |
| | | | 370/329 |
| 2015/0271799 A1* | 9/2015 | Han | H04L 5/0023 |
| | | | 370/329 |
| 2015/0280876 A1 | 10/2015 | You et al. | |
| 2015/0288493 A1* | 10/2015 | Pi | H04L 5/0007 |
| | | | 370/330 |
| 2016/0150561 A1* | 5/2016 | Dinan | H04W 72/0406 |
| | | | 370/329 |
| 2016/0212735 A1* | 7/2016 | Nogami | H04L 5/0048 |
| 2016/0234836 A1* | 8/2016 | Aiba | H04L 1/00 |
| 2016/0323857 A1* | 11/2016 | Kim | H04L 1/0071 |
| 2016/0352400 A1* | 12/2016 | Chae | H04B 7/0456 |
| 2017/0149476 A1* | 5/2017 | Kim | H04L 5/0007 |
| 2017/0201340 A1* | 7/2017 | Yum | H04J 13/0047 |
| 2017/0230946 A1* | 8/2017 | Kim | H04W 72/042 |
| 2017/0311232 A1* | 10/2017 | Yi | H04W 72/042 |
| 2017/0366299 A1* | 12/2017 | Li | H04L 5/00 |
| 2018/0069652 A1* | 3/2018 | Yamamoto | H04L 5/0051 |

FOREIGN PATENT DOCUMENTS

| | | |
|---|---|---|
| WO | 2014/077577 A1 | 5/2014 |
| WO | 2014/109621 A1 | 7/2014 |

OTHER PUBLICATIONS

International Search Report of PCT application No. PCT/CN2015/071807 dated Nov. 6, 2015.

LG Electronics: "PDSCH transmission for MTC coverage enhancement", 3GPP Draft; R1-140309 PDSCH (Final), 3rd Generation Partnership Project (3GPP), Mobile Competence Centre ; 650, Route Des Lucioles ; F-06921 Sophia-Antipolis Cedex; France, vol. RAN WG1, No. Prague, Czech Republic; Feb. 10-14, 2014 Feb. 2014 (Feb. 9, 2014), XP050735859, Retrieved from the Internet: URL:http://www.3gpp.org/ftp/Meetings_3GPP_SYNC/RAN/RAN1/Docs/ [retrieved on Feb. 9, 2014].

Nsn et al: "Performance Evaluation of PBCH With Repetition", 3GPP Draft; R1-135571, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Nov. 11-15, 2013 Nov. 13, 2013 (Nov. 13, 2013), XP050735236, Retrieved from the Internet: URL:http://www.3gpp.org/ftp/Meetings_3GPP_SYNC/RAN/RAN1/Docs/ [retrieved on Nov. 13, 2013].

Russian Search Report dated May 10, 2018 for the related Russian Patent Application No. 2017110621.

The Extended European Search Report dated Aug. 28, 2018 for the related European Patent Application No. 18172970.8.

\* cited by examiner

200 transmitting a data packet repeatedly in multiple subframes including at least one normal subframe and at least one special subframe to another wireless communication device — 201

Normal DL subframe, 2 CRS ports

Config.9, special subframe #1

Config.9, special subframe #2

Config.9, special subframe #3

Legacy control region    CRS
Repeated DL channel    DMRS
GP+UpTS

WIRELESS COMMUNICATION METHOD AND DEVICE

BACKGROUND

1. Technical Field

The present disclosure relates to the field of wireless communication, and in particular, to wireless communication methods and wireless communication devices such as an eNode B (eNB) or user equipment (UE).

2. Description of the Related Art

Machine-Type Communication (MTC) is an important revenue stream for operators and has a huge potential from the operator perspective. Based on the market and operators' requirements, one of the important requirements of MTC is improving the coverage of pieces of MTC UE. To enhance the MTC coverage, almost all of the physical channels need to be enhanced. Repetition in time domain is the main method to improve the coverage of the channels. At the receiver side, the receiver combines all the repetitions of the channel and decodes the information.

In Time Division Duplexing (TDD), not all the subframes in one frame are used for downlink (DL) or uplink (UL) transmission. According to the frame structure in LTE specification, there are DL subframes, UL subframes and special subframes in one frame. In a special subframe, it includes DwPTS, GP and UpPTS, as shown in FIG. 1 which schematically illustrates the structure of a special subframe in TDD. Downlink channel can be transmitted in DwPTS, and uplink channel can be transmitted in UpPTS.

For different special subframe configurations, the lengths of DwPTS and UpPTS are different. Take DwPTS for example, the lengths of DwPTS according to the special subframe configurations are listed in the table below (Table 1).

TABLE 1

| Special subframe configuration | Normal cyclic prefix in downlink DwPTS (number of OFDM symbols) |
|---|---|
| 0 | 3 |
| 1 | 9 |
| 2 | 10 |
| 3 | 11 |
| 4 | 12 |
| 5 | 3 |
| 6 | 9 |
| 7 | 10 |
| 8 | 11 |
| 9 | 6 |

For MTC in coverage enhancement mode, the repetitions of one channel are transmitted in multiple subframes. To fully use the downlink or uplink resource and reduce the latency, it is better to also use DwPTS or UpPTS to transmit downlink or uplink channel repetitions. As the available resources in the special subframe are different from that in the normal subframe, how to map repetition in DwPTS or UpPTS in a special subframe becomes a problem.

SUMMARY

In one general aspect, the techniques disclosed here feature a wireless communication method performed by a wireless communication device, comprising: transmitting a data packet repeatedly in multiple subframes including at least one normal subframe and at least one special subframe to another wireless communication device, wherein the available resources in the special subframe are different from that in the normal subframe, the data packet includes multiple modulated symbols which are divided into multiple modulated-symbol sets, in each subframe, each Orthogonal Frequency Division Multiplexing (OFDM) symbol is mapped by one of the modulated-symbol sets, and in every subframe, the modulated symbols in the same modulated-symbol set are mapped onto Resource Elements (REs) in one OFDM symbol in a fixed order.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figures 1, 2:
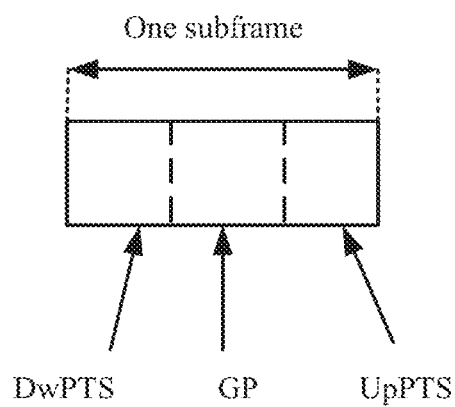
FIG. 1 schematically illustrates the structure of a special subframe in TDD.
FIG. 2 schematically illustrates a flowchart of a wireless communication method at the transmitting side according to a first embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In the present disclosure, wireless communication methods performed by wireless communication devices are provided. Herein, the wireless communication methods can be applied to any type of wireless communications, for example but not limited to communications conforming to LTE specifications, MTC. Similarly, the wireless communication devices can be any devices with wireless communication function such as eNBs or pieces of UE. In addition, in the following description, TDD and downlink transmission may be taken as examples to explain the present disclosure; however, it is noted that the present disclosure is not limited to TDD and downlink transmission but can also be applied to FDD and uplink transmission.

First Embodiment

In the first embodiment of the present disclosure, there is provided a wireless communication method 200 performed by a wireless communication device (first wireless communication device), as shown in FIG. 2 which schematically illustrates the flowchart of the wireless communication method 200 according to the first embodiment. The wireless communication method 200 comprises a step 201 of transmitting a data packet repeatedly in multiple subframes including at least one normal subframe and at least one special subframe to another wireless communication device (second communication device). In this communication method, the data packet is transmitted repeatedly in multiple subframes in order to enhance the physical channel. This repeated transmission is in particular suitable for MTC, but not limited to MTC. It can be applied to any wireless communication requiring channel enhancement. The first communication device and the second communication device can be an eNB, a UE or the like depending on specific application scenarios. For example, if the communication method is applied to downlink communication, the first communication device can be an eNB or the like, and the second communication device can be a UE or the like. Similarly, if the communication method is applied to uplink communication, the first communication device can be an UE or the like, and the second communication device can be an eNB or the like. In the first embodiment, the repeated transmission is performed in two kinds of subframes which are the normal subframe and the specific subframe. The normal subframe and the specific subframe herein can be that defined according to the frame structure in LTE specifications; however, the normal subframe and the specific subframe herein can also be defined otherwise so far as the available resources in the special subframe are different from that in the normal subframe.

In the first embodiment, the data packet includes multiple modulated symbols, and these modulated symbols are divided into multiple modulated-symbol sets. In each subframe, each Orthogonal Frequency Division Multiplexing (OFDM) symbol is mapped by one of the modulated-symbol sets, and in every subframe, the modulated symbols in the same modulated-symbol set are mapped onto Resource Elements (REs) in one OFDM symbol in a fixed order.

Figure 3:
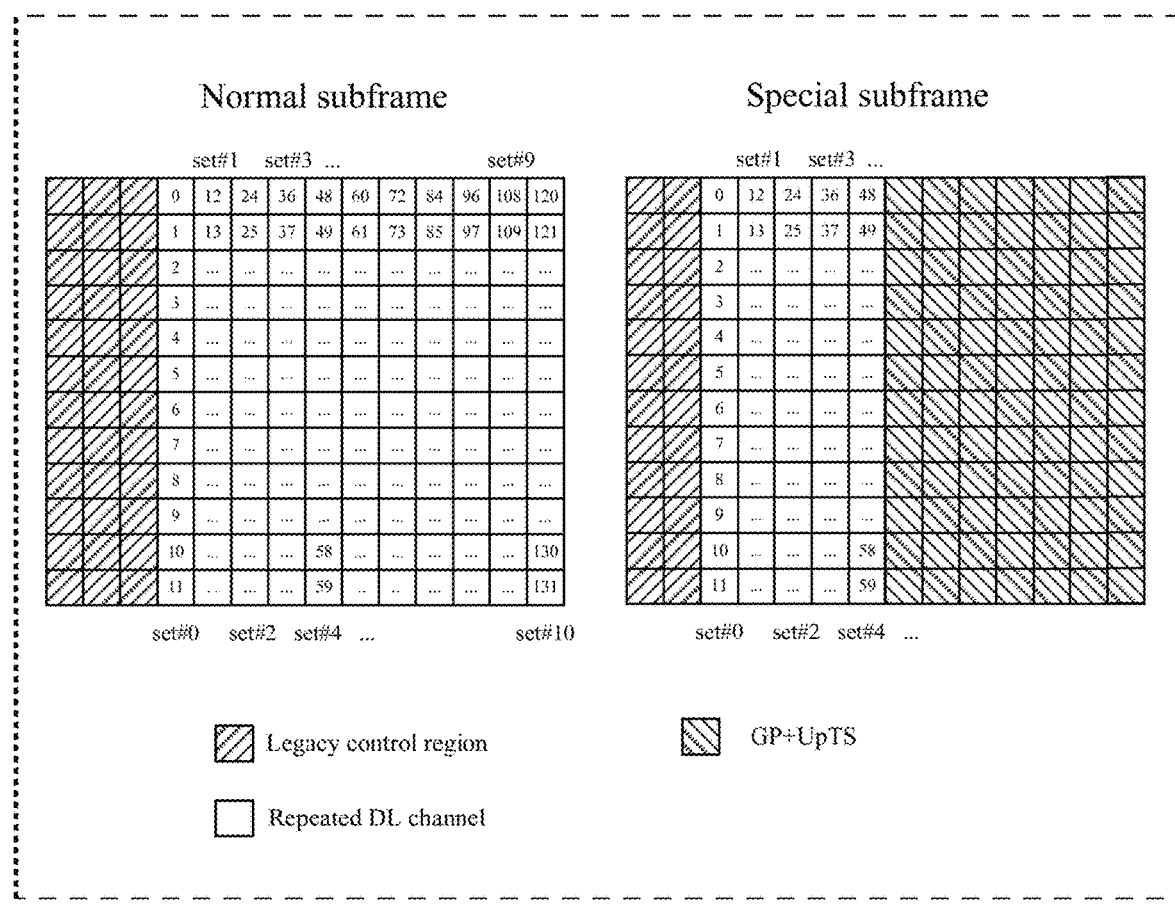
FIG. 3 schematically illustrates an example of resource mapping according to the first embodiment.

FIG. 3 schematically illustrates an example of resource mapping according to the first embodiment. The left subfigure in FIG. 3 shows resource mapping of a normal subframe, and the right subfigure shows resource mapping of a special subframe. The data packet to be transmitted includes multiple modulated symbols which are mapped onto REs in a subframe respectively. As shown in the normal subframe of FIG. 3, there are 132 modulated symbols #0-131 in the data packet which are mapped onto 132 REs in the DL channel of the normal subframe. The 132 modulated symbols are divided into 11 modulated-symbol sets which are sets #0-10, and each set is mapped onto one OFDM symbol in the normal subframe, i.e. one column in the left subfigure of FIG. 3. For example, set #0 including modulated symbols #0-#11 is mapped onto the first (leftmost) OFDM symbol of the repeated DL channel of the normal subframe, set #1 including modulated symbols #12-23 is mapped onto the second OFDM symbol of the repeated DL channel of the normal subframe, and so on. In this example, one complete repetition of the data packet can be transmitted in one normal subframe.

For a special subframe, the available resources for DL transmission in DwPTS may be less than that in the normal because some resources may be used for GP and UpPTS; therefore, one special subframe may not be able to transmit one complete repetition of the data packet. In this case, a part of the modulated symbols of the data packet are transmitted in one special subframe. However, the above resource mapping rule according to the first embodiment can also be applied to the special subframe, that is, in each subframe, each OFDM symbol is mapped by one of the modulated-symbol sets. For example, as shown in the right subfigure of FIG. 3, set #0 including modulated symbols #0-#11 is mapped onto the first (leftmost) OFDM symbol of the repeated DL channel of the special subframe, set #1 including modulated symbols #12-#23 is mapped onto the second OFDM symbol of the repeated DL channel of the special subframe, and so on.

In addition, according to the first embodiment, in every subframe, the modulated symbols in the same modulated-symbol set are mapped onto REs in one OFDM symbol in a fixed order. In other words, for all the subframes for repeatedly transmitting the data packet, the modulated symbols in the same set are mapped onto respective subcarriers in the same order no matter the subframe is a normal subframe or a special subframe. For example, for the set #0 including modulated symbols #0-11 in the FIG. 3, for both the normal subframe and the special subframe, the modulated symbols #0-11 are mapped onto REs of the OFDM subframe from the top to the bottom. In other words, the same or fixed mapping order is used for both the normal subframe and the special subframe. According to the first embodiment, the mapping order is the same for all the subframes for repeatedly transmitting the data packet (i.e., every subframe).

According to the first embodiment of the present disclosure, since one modulated symbol set is mapped onto one OFDM symbol in each subframe and the modulated symbols in the same modulated-symbol set are mapped onto REs in one OFDM symbol in a fixed order in every subframe, the same modulated symbol will be mapped onto the same subcarrier in different repetitions or subframes. Therefore, the symbol level combining at the receiver side becomes possible. Using the symbol level combining, the receiver needs not to do channel estimation, channel equalization and demodulation of each repetition. This will reduce the complexity and power consumption of the pieces of UE, in particular, pieces of MTC UE, which is the main requirement of pieces of MTC UE or many other pieces of UE.

It is noted that, FIG. 3 takes the downlink transmission as an example in which the data packet is transmitted in DwPTS when it is transmitted in the special subframe, but the first embodiment can also be applied to uplink transmission in which the data packet can be transmitted in UpPTS when it is transmitted in the special subframe. In addition, if the available OFDM symbols for the transmission in a special subframe is smaller than that in a normal subframe, a part of the modulated symbols of the data packet are transmitted in one special subframe, and all the modulated symbols of the data packet can be transmitted cyclically in different special subframes. For example, sets #0-4 are transmitted in the first special subframe, sets #5-9 are transmitted in the second special subframe, set #10 and sets #0-3 are transmitted in the third special subframe, and so on. In this manner, all the modulated symbols can obtain balanced repetition gain. However, alternatively, it is possible to always truncate the same part of the modulated symbols to be transmitted in different special subframes.

Further, as an improvement to the first embodiment, reference signals (RSs) are to be considered in the resource mapping. In an exemplary embodiment, the modulated-symbol set transmitted in an OFDM symbol with RSs in the normal subframe can be also transmitted in an OFDM symbol with the RSs in a special subframe (e.g., in DwPTS). It is noted that the RSs in the normal subframe and the RSs in the special subframe here refer to the same kind of RS. For example, the modulated-symbol set transmitted in an OFDM symbol with CRS in the normal subframe is also transmitted in an OFDM symbol with CRS in DwPTS, and similarly the modulated-symbol set transmitted in an OFDM symbol with DMRS in the normal subframe is also transmitted in an OFDM symbol with DMRS in DwPTS. In addition, if the number of the OFDM symbols with the RSs in DwPTS is less than that in the normal downlink subframe, the modulated-symbol sets transmitted in OFDM symbols with the RSs in the normal downlink subframe may be transmitted cyclically in OFDM symbols with the RSs in DwPTS of multiple special subframes. And, the modulated-symbol sets transmitted in OFDM symbols without any RS in a normal downlink subframe may be transmitted cyclically in OFDM symbols without any RS in DwPTS of multiple special subframes.

Figure 4:
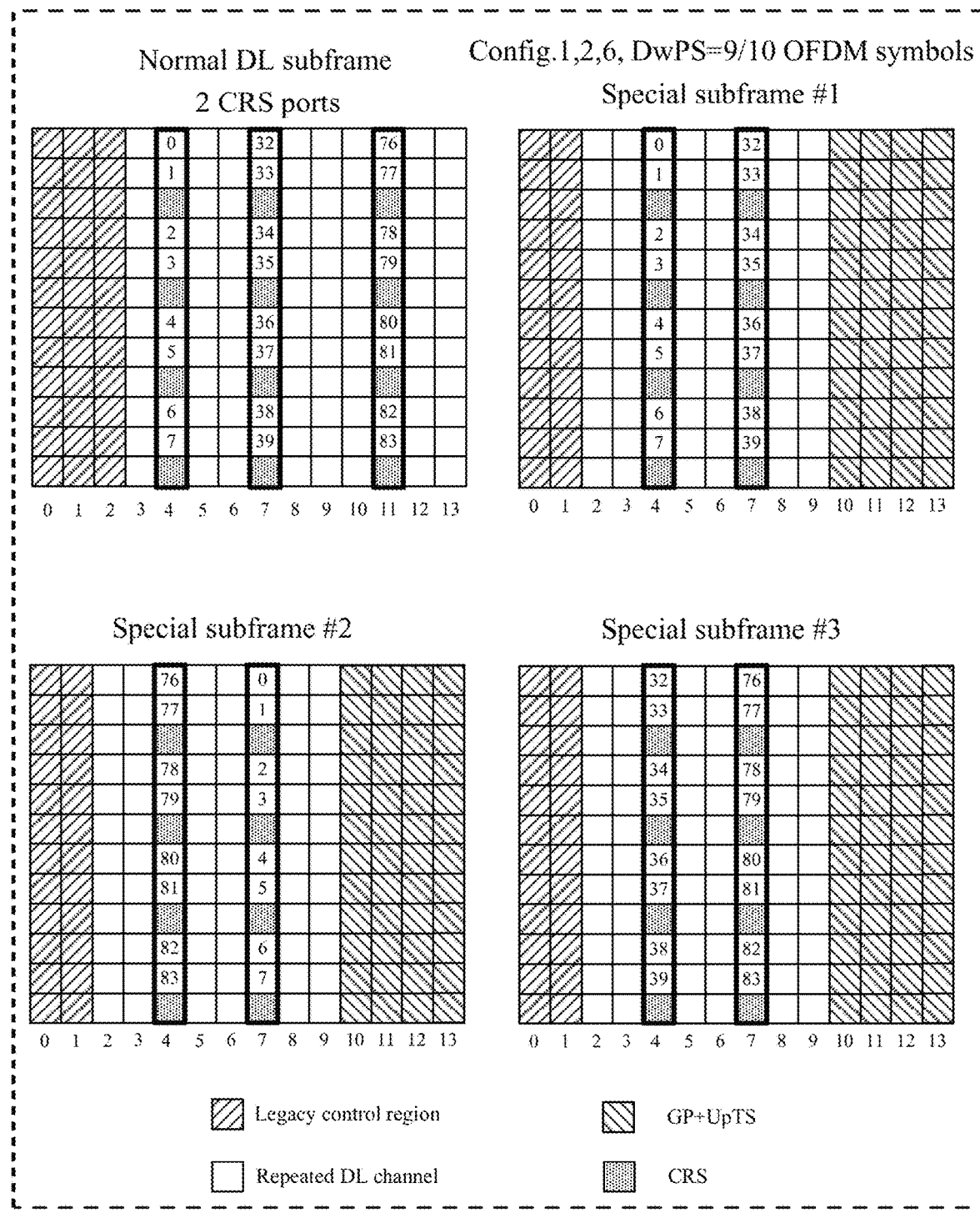
FIG. 4 schematically illustrates exemplary resource mapping considering CRS according to an example of the first embodiment.

FIG. 4 schematically illustrates exemplary resource mapping considering CRS according to an example of the first embodiment. In this example, the modulated-symbol set transmitted in an OFDM symbol with CRS in the normal subframe is transmitted in an OFDM symbol with CRS in DwPTS. The four subfigures of FIG. 4 are the normal DL subframe, the special subframe #1, the special subframe #2, and the special subframe #3 respectively, in which the dotted REs represent the CRS positions (REs). It can be seen that the modulated-symbol set consisting of the modulated symbols #0-7, the modulated-symbol set consisting of the modulated symbols #32-39, and the modulated-symbol set consisting of the modulated symbols #76-83 are mapped onto OFDM symbols with CRS (the OFDM symbols #4, #7 and #11) in the normal subframe respectively, and those modulated-symbol sets are also mapped onto OFDM symbols with CRS (the OFDM symbols #4 and #7) in the special subframes. In addition, in this example, since the number of the OFDM symbols with CRS in DwPTS of the special subframes is less than that in the normal DL subframe, the modulated-symbol sets transmitted in OFDM symbols with CRS in the normal downlink subframe are transmitted cyclically in OFDM symbols with CRS in DwPTS of multiple special subframes. As shown in FIG. 4, the special subframe #2 transmits the set consisting of the modulated symbols #0-7 again after finishing the transmission of the set consisting of the modulated symbols #76-83. In addition, optionally, the modulated-symbol sets transmitted in OFDM symbols without CRS in the normal downlink subframe can be transmitted cyclically in OFDM symbols without CRS in DwPTS. According to the example shown in FIG. 4, the performance imbalance among the modulated symbols transmitted in OFDM symbols with CRS is alleviated without changing the mapped subcarrier.

Figure 5:
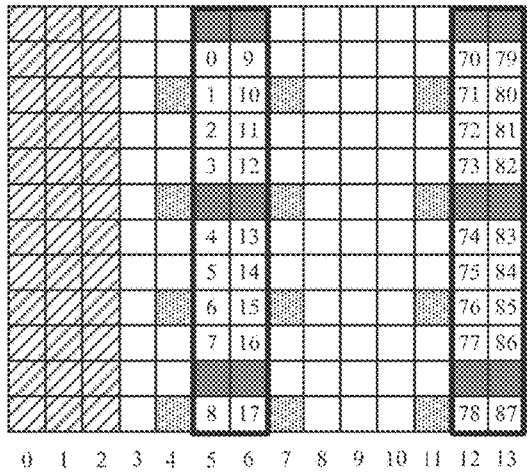
FIG. 5 schematically illustrates exemplary resource mapping considering DMRS according to an example of the first embodiment.
Figure 5:
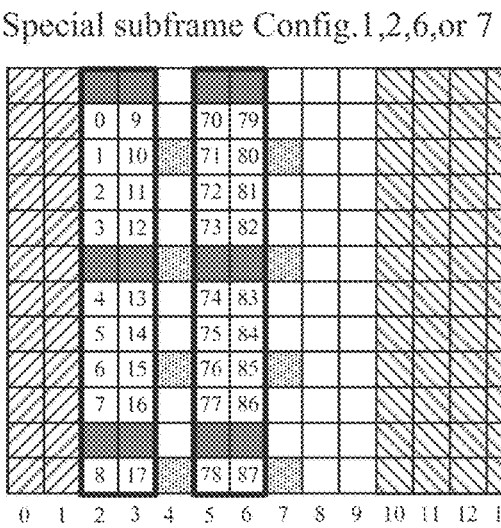
Figure 5:
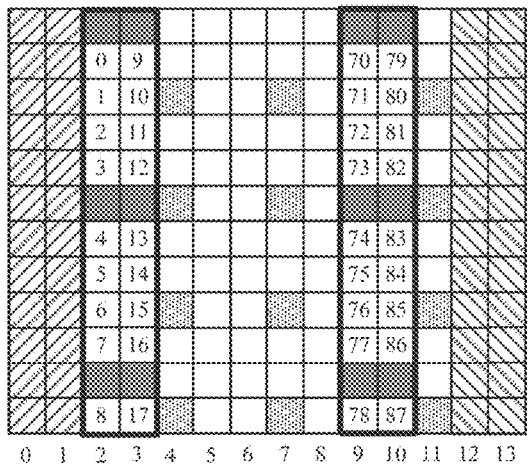
Figure 5:
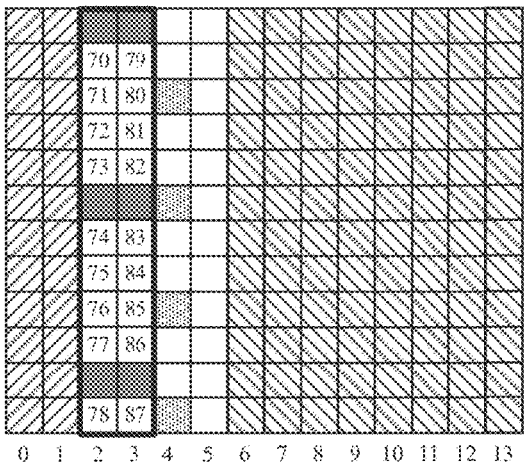

FIG. 5 schematically illustrates exemplary resource mapping considering DMRS according to an example of the first embodiment. In this example, the modulated-symbol set transmitted in an OFDM symbol with DMRS in the normal subframe is transmitted in an OFDM symbol with DMRS in DwPTS. The five subfigures of FIG. 5 are the normal DL subframe, the special subframe with configuration 1, 2, 6 or 7 as defined in Table 1, the special subframe with configuration 3, 4 or 8, the special subframe #1 with configuration 9, and the special subframe #2 with configuration 9 respectively, in which the dotted REs represent the CRS positions and the gray REs represent the DMRS positions. It can be seen that the modulated-symbol set consisting of the modulated symbols #0-8, the modulated-symbol set consisting of the modulated symbols #9-17, the modulated-symbol set consisting of the modulated symbols #70-78, and the modulated-symbol set consisting of the modulated symbols #79-87 are mapped onto OFDM symbols with DMRS (the OFDM symbols #5, #6, #12 and #13) in the normal subframe respectively, and those modulated-symbol sets are also mapped onto OFDM symbols with DMRS in the special subframes. In addition, in this example, since the number of the OFDM symbols with DMRS in DwPTS of the special subframes with configuration 9 is less than that in the normal downlink subframe, the modulated-symbol sets transmitted in OFDM symbols with DMRS in the normal downlink subframe can be transmitted cyclically in OFDM symbols with DMRS in DwPTS of multiple special subframes with configuration 9. As shown in FIG. 5, the special subframes #1 and #2 with configuration 9 both transmit two different modulated-symbol sets respectively. In addition, optionally, the modulated-symbol sets transmitted in OFDM symbols without DMRS in the normal downlink subframe can be transmitted cyclically in OFDM symbols without DMRS in DwPTS. According to the example shown in FIG. 5, the same modulated symbol is mapped onto the same subcarrier even if the DMRS positions are different in the normal DL and in the special subframe, which makes the symbol level combining possible. In addition, the performance imbalance among the modulated symbols transmitted in OFDM symbols with CRS is also alleviated.

Figure 6:
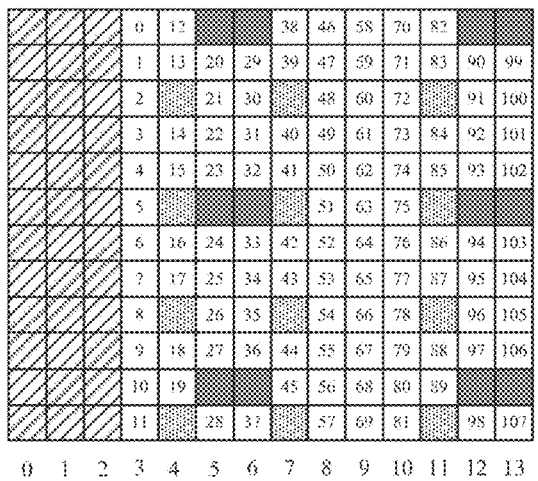
FIG. 6 schematically illustrates exemplary resource mapping considering both CRS and DMRS according to an example of the first embodiment.
Figure 6:
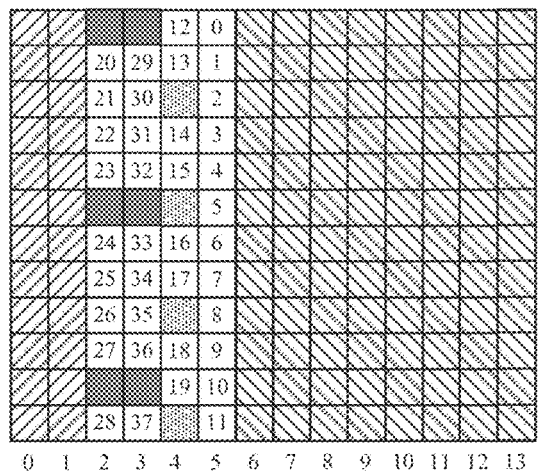
Figure 6:
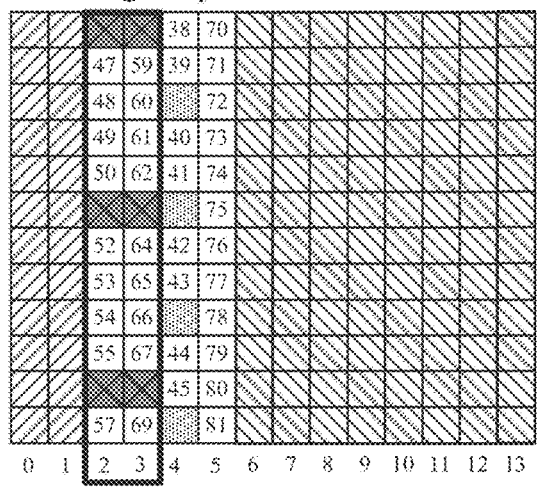
Figure 6:
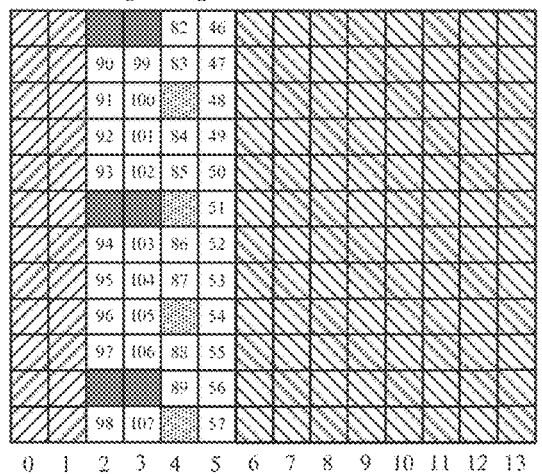

FIG. 6 schematically illustrates exemplary resource mapping considering both CRS and DMRS according to an example of the first embodiment. In this example, the modulated-symbol set transmitted in an OFDM symbol with CRS in the normal subframe is transmitted in an OFDM symbol with CRS in DwPTS, and the modulated-symbol set transmitted in an OFDM symbol with DMRS in the normal subframe is transmitted in an OFDM symbol with DMRS in DwPTS. As for the modulated-symbol sets transmitted in OFDM symbols without any RS in the normal subframe, some of them are transmitted in OFDM symbols without any RS in DwPTS, and some of them are transmitted in OFDM symbols with RSs (e.g. DMRS) in DwPTS. In other words, at least one of the modulated-symbol sets transmitted in OFDM symbols without any RS in a normal downlink subframe is transmitted in OFDM symbols with RSs in DwPTS. The modulated symbols supposed to be transmitted in RS positions in DwPTS are punctured in the RS positions, that is, they are not transmitted in the RS positions. In this manner, it is possible to make the repeated transmission of modulated symbols mapped onto OFDM symbols with RS and without RS more balanced. It is noted that the mapping manners for the modulated-symbol sets transmitted in OFDM symbols without any RS in the normal subframe illustrated in the examples of FIG. 4, FIG. 5 and FIG. 6 can be exchanged with each other.

Four subfigures are shown in FIG. 6, which are the normal DL subframe, the special subframe #1 with configuration 9, the special subframe #2 with configuration 9 and the special subframe #3 with configuration 9 respectively, in which the dotted REs represent the CRS positions and the gray REs represent the DMRS positions. As can be seen in FIG. 6, the modulated-symbol set consisting of the modulated symbols #12-19, the modulated-symbol set consisting of the modulated symbols #38-45, and the modulated-symbol set consisting of the modulated symbols #82-89 are mapped onto OFDM symbols with CRS (the OFDM symbols #4, #7 and #11) in the normal subframe respectively, and those modulated-symbol sets are also mapped onto OFDM symbols with CRS in the special subframes #1, #2 and #3 respectively. The modulated-symbol set consisting of the modulated symbols #20-28, the modulated-symbol set consisting of the modulated symbols #29-37, the modulated-symbol set consisting of the modulated symbols #90-98, and the modulated-symbol set consisting of the modulated symbols #99-107 are mapped onto OFDM symbols with DMRS (the OFDM symbols #5, #6, #12 and #13) in the normal subframe respectively, and those modulated-symbol sets are mapped onto OFDM symbols with DMRS in the special subframes #1 and #3 respectively. The remaining modulated-symbol sets are mapped onto OFDM symbols without any RS in the normal subframe. Among these remaining modulated-symbol sets, the modulated-symbol set consisting of the modulated symbols #46-57 and the modulated-symbol set consisting of the modulated symbols #58-69 are mapped onto the OFDM symbols with DMRS in the special subframe #2. Since the DMRS positions (REs) in the special subframe #2 are used to transmit DMRS, the modulated symbols (#46, #51, #56, #58, #63 and #68 in this example) supposed to be mapped onto these RS positions are punctured in these DMRS positions, i.e., are not transmitted in these positions, as shown by "x" in the special subframe #2 of FIG. 6. For other modulated-symbols, they can be mapped onto OFDM symbols without any RS in the special subframes.

Figure 7:
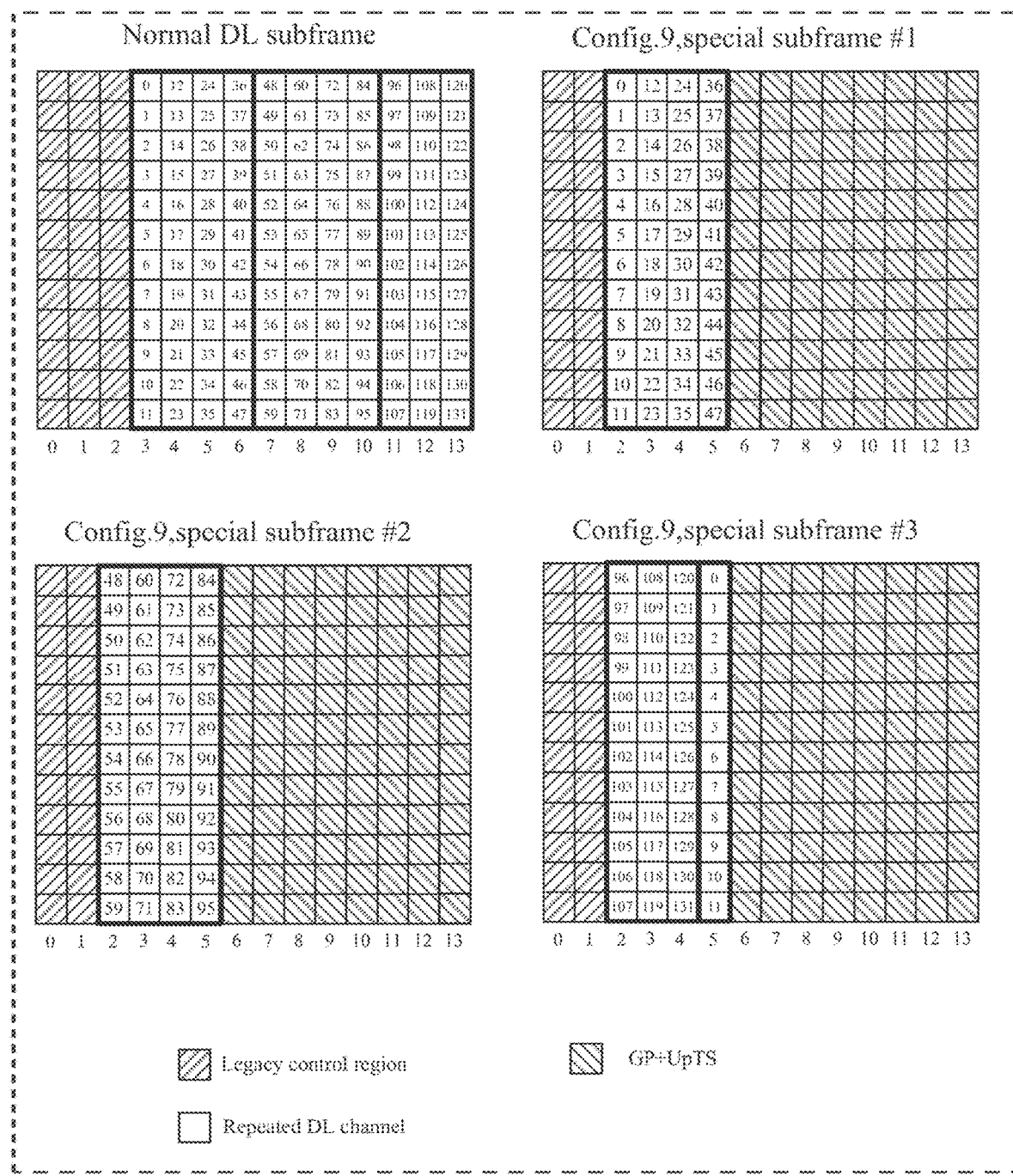
FIG. 7 schematically illustrates exemplary cyclic resource mapping according to an example of the first embodiment.

FIG. 7 schematically illustrates exemplary cyclic resource mapping according to an example of the first embodiment. In this example, the modulated-symbol sets transmitted in a normal DL subframe are transmitted cyclically in DwPTS of multiple special subframes. The granularity is OFDM symbols in time domain. As shown in FIG. 7, the modulated symbol sets transmitted in OFDM symbols {#3, #4, #5, #6}, {#7, #8, #9, #10}, {#11, #12, #13, #0}, . . . in the normal DL subframe are transmitted in special subframes #1, #2, #3, . . . cyclically.

Figure 8:
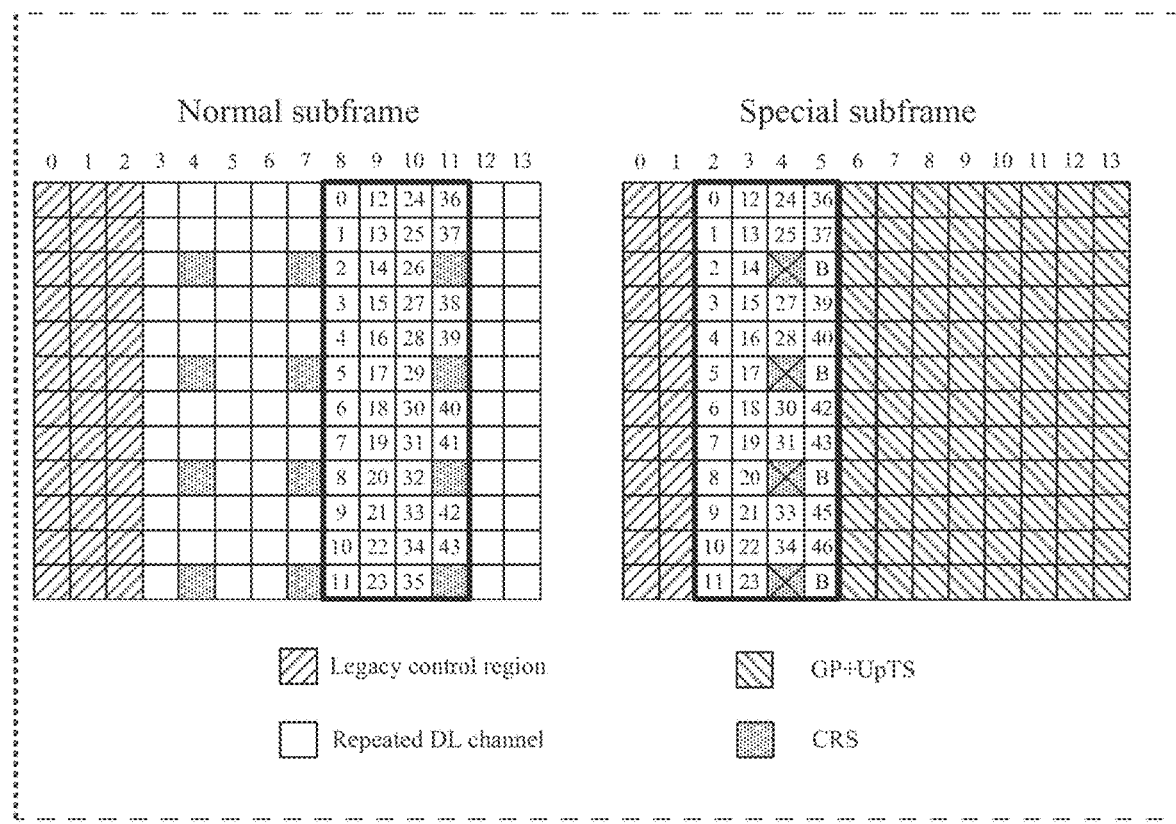
FIG. 8 schematically illustrates an example of handling RS REs according to an example of the present disclosure.

In the above example, the RS REs can be handled in such a manner that the modulated symbols supposed to be transmitted in RS positions (REs) in DwPTS are punctured in the RS positions, and the REs in DwPTS corresponding to the RS REs in the normal subframe are left blank. FIG. 8 schematically illustrates an example of handling RS REs according to an example of the present disclosure. In FIG. 8, the modulated-symbol sets mapped onto OFDM symbols {#8, #9, #10, #11} in the normal subframe are mapped onto OFDM symbols {#2, #3, #4, #5} in the special subframe. The modulated symbols #26, #29, #32 and #35 are punctured in the special subframe since the REs onto which those modulated symbols are supposed to be mapped in the special subframe are CRS REs, as shown by "x" in the special subframe. In addition, the REs represented by "B" in the OFDM symbol #5 of the special subframe are corresponding to the CRS REs in the OFDM symbol #11 of the normal subframe according to the above mapping manner; therefore, those REs represented by "B" in the OFDM symbol #5 of the special subframe are left blank.

According to the example shown in FIG. 7 and FIG. 8, the transmitting symbols are almost with complete balanced performance. In addition, there is no need to consider the RS positions, and thus it is easy to implement. It is noted that the manner of handling RS REs illustrated in FIG. 8 can also be applied to other examples or embodiments of the present disclosure if appropriate.

Figure 9:
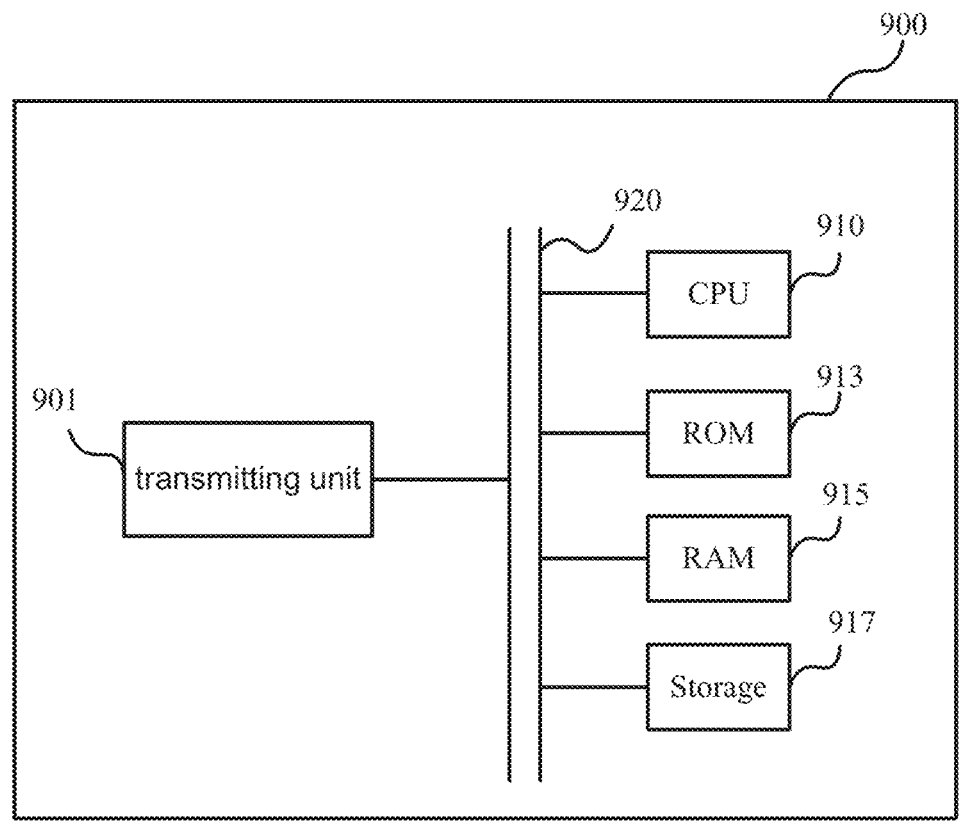
FIG. 9 schematically illustrates a block diagram of a wireless communication device at the transmitting side according to the first embodiment.

In the first embodiment, there is also provided a wireless communication device (first wireless communication) for performing the above methods. FIG. 9 is a block diagram illustrating a wireless communication device 900 according to the first embodiment of the present disclosure. The wireless communication device 900 can comprise a transmitting unit 901 which is configured to transmit a data packet repeatedly in multiple subframes including at least one normal subframe and at least one special subframe to another wireless communication device (second wireless communications device), wherein the available resources in the special subframe are different from that in the normal subframe, the data packet includes multiple modulated symbols which are divided into multiple modulated-symbol sets, in each subframe, each Orthogonal Frequency Division Multiplexing (OFDM) symbol is mapped by one of the modulated-symbol sets, and in every subframe, the modulated symbols in the same modulated-symbol set are mapped onto Resource Elements (REs) in one OFDM symbol in a fixed order. It is noted that the above explanations for the methods are also applied to the device here, which will not be repeated again.

The wireless communication device 900 according to the present disclosure may optionally include a CPU (Central Processing Unit) 910 for executing related programs to process various data and control operations of respective units in the wireless communication device 900, a ROM (Read Only Memory) 913 for storing various programs required for performing various process and control by the CPU 910, a RAM (Random Access Memory) 915 for storing intermediate data temporarily produced in the procedure of process and control by the CPU 910, and/or a storage unit 917 for storing various programs, data and so on. The above transmitting unit 901, CPU 910, ROM 913, RAM 915 and/or storage unit 917 etc. may be interconnected via data and/or command bus 920 and transfer signals between one another.

Respective units as described above do not limit the scope of the present disclosure. According to one implementation of the disclosure, the functions of the above transmitting unit 901 may be implemented by hardware, and the above CPU 910, ROM 913, RAM 915 and/or storage unit 917 may not be necessary. Alternatively, the functions of the above transmitting unit 901 may also be implemented by functional software in combination with the above CPU 910, ROM 913, RAM 915 and/or storage unit 917 etc.

Figure 10:
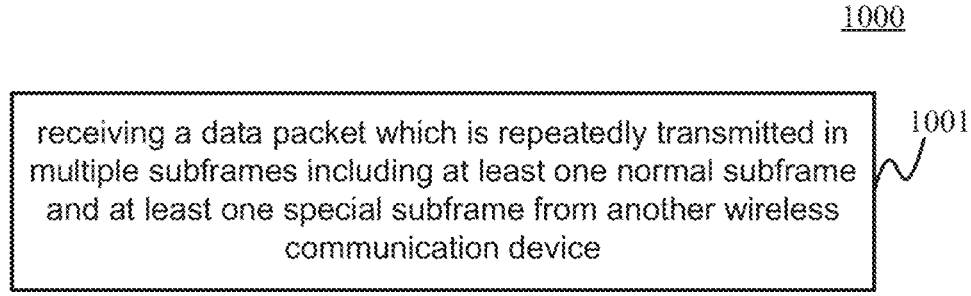
FIG. 10 schematically illustrates a flowchart of a wireless communication method at the receiving side according to the first embodiment of the present disclosure.

Accordingly, at the receiving side, the first embodiment provides a wireless communication method 1000 performed by a wireless communication device (second communication device) as shown in FIG. 10. The wireless communication method 1000 comprising a step 1001 of receiving a data packet which is repeatedly transmitted in multiple subframes including at least one normal subframe and at least one special subframe from another wireless communication device (first communication device), wherein the available resources in the special subframe are different from that in the normal subframe, the data packet includes multiple modulated symbols which are divided into multiple modulated-symbol sets, in each subframe, each Orthogonal Frequency Division Multiplexing (OFDM) symbol is mapped by one of the modulated-symbol sets, and in every subframe, the modulated symbols in the same modulated-symbol set are mapped onto Resource Elements (REs) in one OFDM symbol in a fixed order. It is noted that the above explanations for the methods at the transmitting side are also applied to the method 1000, which will not be repeated again.

Figure 11:
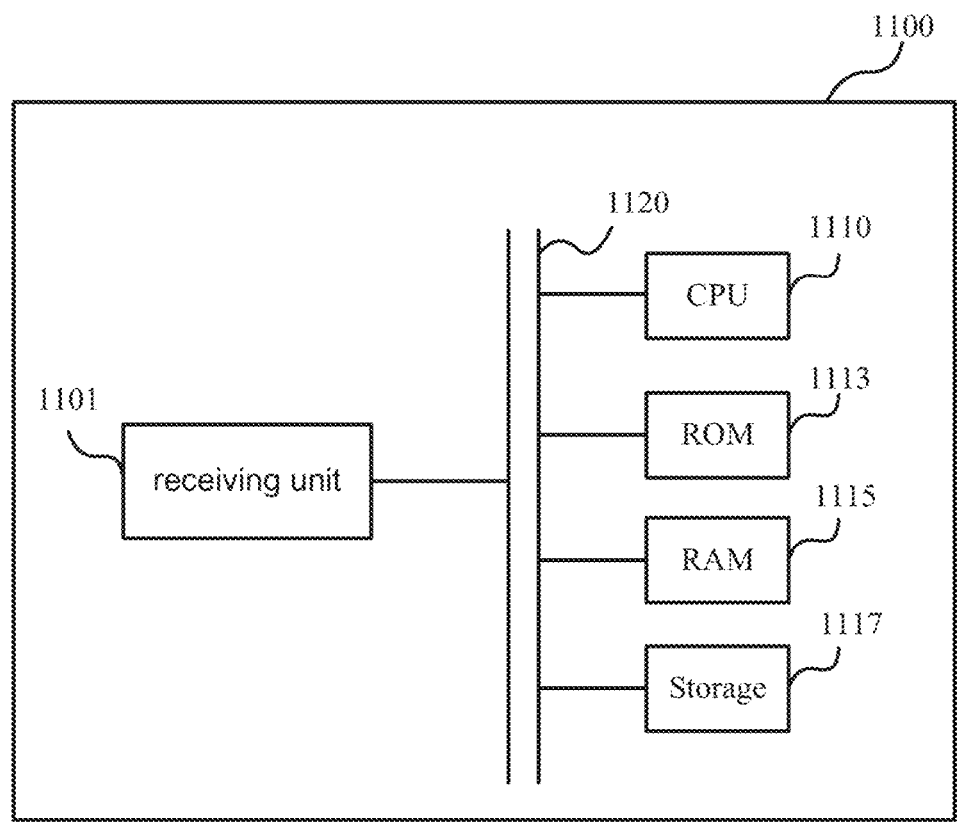
FIG. 11 schematically illustrates a block diagram of a wireless communication device at the receiving side according to the first embodiment.

In addition, in the first embodiment, there is also provided a wireless communication device (second wireless communication) for performing the above method at the receiving side. FIG. 11 is a block diagram illustrating a wireless communication device 1100 at the receiving side according to the first embodiment of the present disclosure. The wireless communication device 1100 can comprise a receiving unit 1101 configured to receive a data packet which is repeatedly transmitted in multiple subframes including at least one normal subframe and at least one special subframe from another wireless communication device (first wireless communications device), wherein the available resources in the special subframe are different from that in the normal subframe, the data packet includes multiple modulated symbols which are divided into multiple modulated-symbol sets, in each subframe, each Orthogonal Frequency Division Multiplexing (OFDM) symbol is mapped by one of the modulated-symbol sets, and in every subframe, the modulated symbols in the same modulated-symbol set are mapped onto Resource Elements (REs) in one OFDM symbol in a fixed order. It is noted that the above explanations for the methods are also applied to the device here, which will not be repeated again.

The wireless communication device 1100 according to the present disclosure may optionally include a CPU (Central Processing Unit) 1110 for executing related programs to process various data and control operations of respective units in the wireless communication device 1100, a ROM (Read Only Memory) 1113 for storing various programs required for performing various process and control by the CPU 1110, a RAM (Random Access Memory) 1115 for storing intermediate data temporarily produced in the procedure of process and control by the CPU 1110, and/or a storage unit 1117 for storing various programs, data and so on. The above receiving unit 1101, CPU 1110, ROM 1113, RAM 1115 and/or storage unit 1117 etc. may be interconnected via data and/or command bus 1120 and transfer signals between one another.

Respective units as described above do not limit the scope of the present disclosure. According to one implementation of the disclosure, the functions of the above receiving unit 1101 may be implemented by hardware, and the above CPU 1110, ROM 1113, RAM 1115 and/or storage unit 1117 may not be necessary. Alternatively, the functions of the above receiving unit 1101 may also be implemented by functional software in combination with the above CPU 1110, ROM 1113, RAM 1115 and/or storage unit 1117 etc.

Second Embodiment

Figure 12:
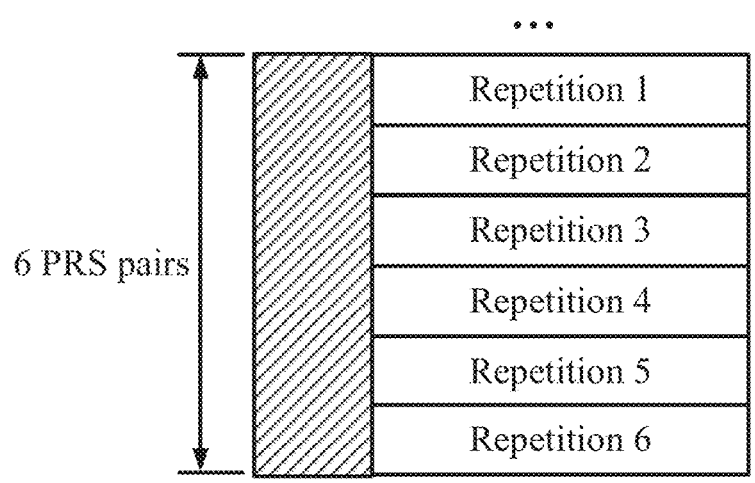
FIG. 12 schematically illustrates multiple repetitions transmitted in one subframe.

In some application scenarios, for example, for control channel for pieces of MTC UE in enhanced coverage, multiple repetitions can be transmitted in one subframe as shown in FIG. 12 which schematically illustrates multiple repetitions transmitted in one subframe. FIG. 12 exemplarily shows that 6 repetitions are transmitted in one subframe. For this case, the second embodiment of the present disclosure provides a wireless communication method performed by a wireless communication device (first communication device). The wireless communication method can comprises a step of transmitting a data packet repeatedly in multiple subframes including at least one normal subframe and at least one special subframe to another wireless communication device (second communication device), wherein the available resources in the special subframe are different from that in the normal subframe. The wireless communication method in the second embodiment can have the same flowchart as shown in FIG. 2 for the first embodiment, and the details described for the first embodiment may also be applied to the second embodiment unless the context indicates otherwise.

Figure 13:
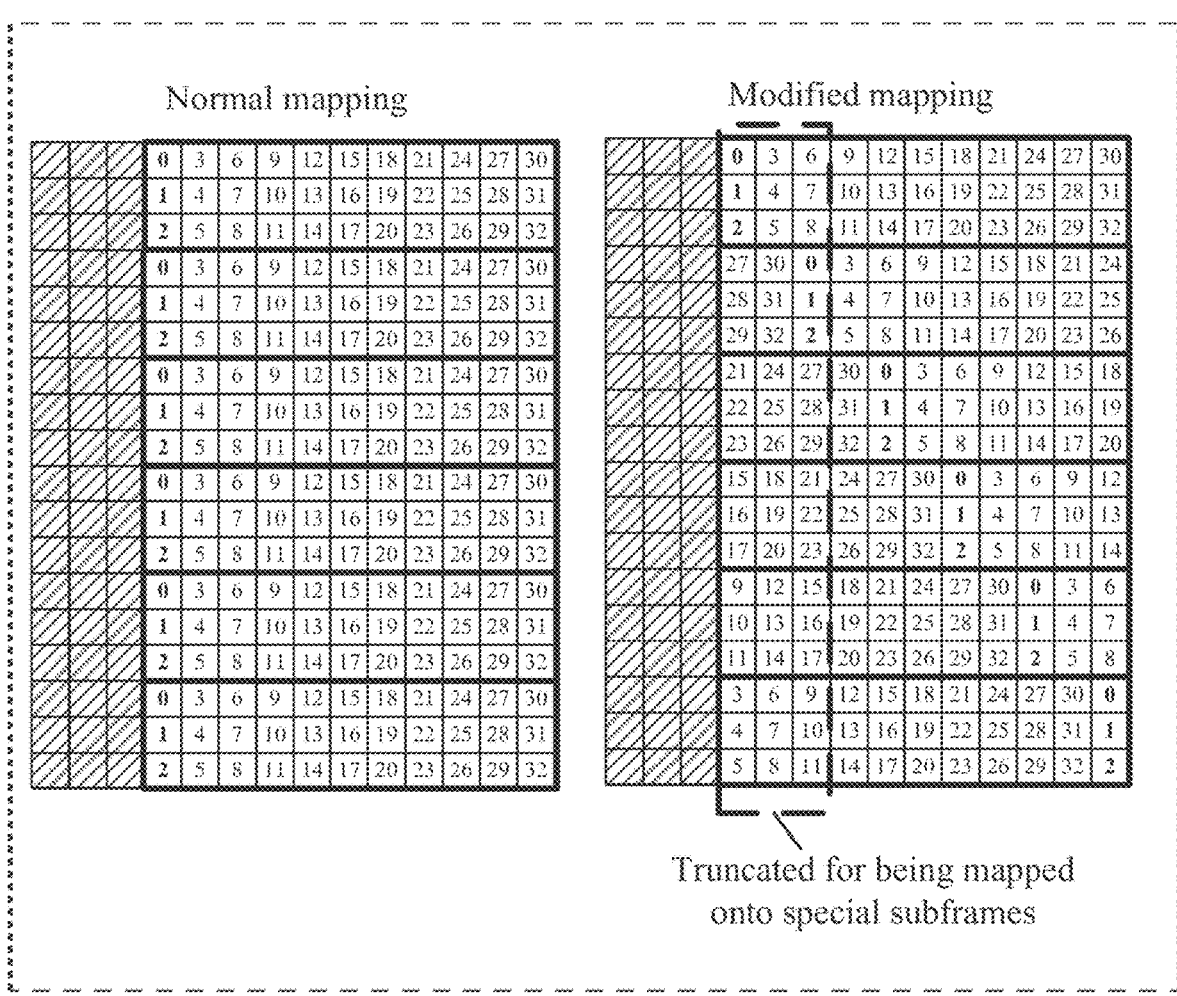
FIG. 13 illustrates an example of resource mapping with cyclic shift according to a second embodiment of the present disclosure.

In the second embodiment, multiple repetitions of the data packet are transmitted in each subframe, and in each subframe, different repetitions are mapped onto REs with cyclic shift. The shift granularity can be modulated symbol level. FIG. 13 illustrates an example of the resource mapping with cyclic shift according to the second embodiment, in which 6 repetitions in one subframe is taken as an example. The left subfigure of FIG. 13 shows normal mapping without shift in a normal subframe, and the right subfigure shows modified mapping with cyclic shift in the normal subframe. In the example of FIG. 13, each PRB pair comprises three subcarriers for transmitting one repetition, and in each PRB pair, modulated symbols of the data packet are mapped onto REs for example in an order of mapping first in the frequency domain and then in the time domain. The difference between the normal mapping and the modified mapping is as follows. In the normal mapping, each repetition is mapped onto one PRB pair in exactly the same manner; however, in the modified mapping, among the repetitions in one subframe, cyclic shift is applied to the mapping. As shown in the modified mapping of FIG. 13, cyclic shift of 6 modulated symbols is applied between adjacent repetitions. It is noted that the second embodiment is not limited to the specific mapping manner shown in FIG. 13. For example, the cyclic shift is not limited to 6 modulated symbols, but can be any appropriate number of modulated symbols, and the number of subcarriers in each PRB pair is not limited to 3.

According to the second embodiment, it is possible to always truncate the same part of the normal subframe to be mapped onto special subframes while remaining balanced performance among the modulated symbols. As shown in the modified mapping of FIG. 13, the modulated symbols of the first three OFDM symbols of the repeated DL channel of the normal symbol can always be truncated to be mapped onto DwPTS of special subframes. It can be seen that almost every modulated symbol can be included in the truncated part due to the cyclic shift; therefore balanced performance can be obtained among the modulated symbols of the data packet. In contrast, if the first three OFDM symbols in the normal mapping are always truncated to be mapped onto special subframes, then the modulated symbols #0-8 can be transmitted in the special subframes, resulting in imbalanced performance among the modulated symbols of the data packet.

It is noted that, in the second embodiment, the normal subframes can also adopt other mapping manners such as the normal mapping shown in FIG. 13, but the special subframes employ the mapping with cyclic shift. In addition, some implementations of the first embodiment can be combined with the second embodiment unless the context indicates otherwise.

In the second embodiment, there is also provided a wireless communication device (first wireless communications device) comprising a transmitting unit configured to transmit a data packet repeatedly in multiple subframes including at least one normal subframe and at least one special subframe to another wireless communication device, wherein the available resources in the special subframe are different from that in the normal subframe, multiple repetitions of the data packet are transmitted in each subframe, and in each special subframe, different repetitions are mapped onto Resource Elements (REs) with cyclic shift. The first wireless communication device in the second embodiment can have the same structure as that in the first embodiment shown in FIG. 9.

Accordingly, at the receiving side, the second embodiment also provides a wireless communication method performed by a wireless communication device (second communication device). The wireless communication method here can have the same flowchart as shown in FIG. 10 and comprise a step of receiving a data packet which is repeatedly transmitted in multiple subframes including at least one normal subframe and at least one special subframe from another wireless communication device (first communication device), wherein the available resources in the special subframe are different from that in the normal subframe, multiple repetitions of the data packet are transmitted in each subframe, and in each special subframe, different repetitions are mapped onto Resource Elements (REs) with cyclic shift. It is noted that the above explanations for the method at the transmitting side are also applied to the method at the receiving side, which will not be repeated again.

Further, in the second embodiment, there is also provided a wireless communication device (second wireless communications device) for the receiving side comprising a receiving unit configured to receive a data packet which is repeatedly transmitted in multiple subframes including at least one normal subframe and at least one special subframe from another wireless communication device (first wireless communication device), wherein the available resources in the special subframe are different from that in the normal subframe, multiple repetitions of the data packet are transmitted in each subframe, and in each special subframe, different repetitions are mapped onto Resource Elements (REs) with cyclic shift. The second wireless communication device in the second embodiment can have the same structure as that in the first embodiment shown in FIG. 11.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

What is claimed is:

1. A communication device comprising:
 a receiver, which, in operation,
  receives a modulation symbol set mapped to a first Orthogonal Frequency Division Multiplexing (OFDM) symbol, to which a reference signal is mapped, in a first subframe, and
  receives the modulation symbol set mapped to a second OFDM symbol, to which the reference signal is mapped and which is different from the first OFDM symbol, in a second subframe that is different from the first subframe; and
 circuitry, which is coupled to the receiver and which, in operation,
  process the modulation symbol set repeatedly received in the first subframe and in the second subframe, and
  process the reference signal received in the first subframe and in the second subframe.

2. The communication device according to claim 1, wherein the receiver, in operation,
 receives another modulation symbol set mapped to a third OFDM symbol, to which the reference signal is not mapped, in the first subframe, and
 receives the another modulation symbol set mapped to a fourth OFDM symbol, to which the reference signal is not mapped and which is different from the third OFDM symbol, in the second subframe, and
 the circuitry, in operation,
  process the another modulation symbol set repeatedly received in the first subframe and in the second subframe.

3. The communication device according to claim 1, wherein the receiver, in operation,
 receives another modulation symbol set mapped to a third OFDM symbol, in the first subframe, and
 receives the another modulation symbol set mapped to a fourth OFDM symbol, to which another reference signal is mapped and which is different from the third OFDM symbol, in the second subframe, wherein one or more symbols of the another modulation symbol set, which correspond to one or more resource elements of the fourth OFDM symbol, are punctured, and the another reference signal is mapped to the one or more resource elements, and
 the circuitry, in operation,
  process the another modulation symbol set repeatedly received in the first subframe and in the second subframe, and process the another reference signal received in the second subframe.

4. The communication device according to claim 1, wherein the first and second subframes are configured in a Frequency Division Duplexing (FDD).

5. The communication device according to claim 1, wherein the first and second subframes are configured in a Time Division Duplexing (TDD) and include a normal subframe and a special subframe.

6. The communication device according to claim 1, wherein the receiver, in operation,
receives the modulation symbol set mapped to the first OFDM symbol, and
receives the modulation symbol set mapped to the second OFDM symbol, in a fixed order relative to the first OFDM symbol.

7. A communication method, comprising:
receiving a modulation symbol set mapped to a first Orthogonal Frequency Division Multiplexing (OFDM) symbol, to which a reference signal is mapped, in a first subframe;
receiving the modulation symbol set mapped to a second OFDM symbol, to which the reference signal is mapped and which is different from the first OFDM symbol, in a second subframe that is different from the first subframe;
processing the modulation symbol set repeatedly received in the first subframe and in the second subframe; and
processing the reference signal received in the first subframe and in the second subframe.

8. The communication method according to claim 7, comprising:
receiving another modulation symbol set mapped to a third OFDM symbol, to which the reference signal is not mapped, in the first subframe;
receiving the another modulation symbol set mapped to a fourth OFDM symbol, to which the reference signal is not mapped and which is different from the third OFDM symbol, in the second subframe; and
processing the another modulation symbol set repeatedly received in the first subframe and in the second subframe.

9. The communication method according to claim 7, comprising:
receiving another modulation symbol set mapped to a third OFDM symbol, in the first subframe;
receiving the another modulation symbol set mapped to a fourth OFDM symbol, to which another reference signal is mapped and which is different from the third OFDM symbol, in the second subframe, wherein one or more symbols of the another modulation symbol set, which correspond to one or more resource elements of the fourth OFDM symbol, are punctured, and the another reference signal is mapped to the one or more resource elements;
processing the another modulation symbol set repeatedly received in the first subframe and in the second subframe; and
processing the another reference signal received in the second subframe.

10. The communication method according to claim 7, wherein the first and second subframes are configured in a Frequency Division Duplexing (FDD).

11. The communication method according to claim 7, wherein the first and second subframes are configured in a Time Division Duplexing (TDD) and include a normal subframe and a special subframe.

12. The communication method according to claim 7, comprising:
receiving the modulation symbol set mapped to the first OFDM symbol, and
receiving the modulation symbol set mapped to the second OFDM symbol, in a fixed order relative to the first OFDM symbol.

* * * * *